May 22, 1951 J. S. O'CALLAGHAN 2,554,342
SPINNING BAIT
Filed June 3, 1948
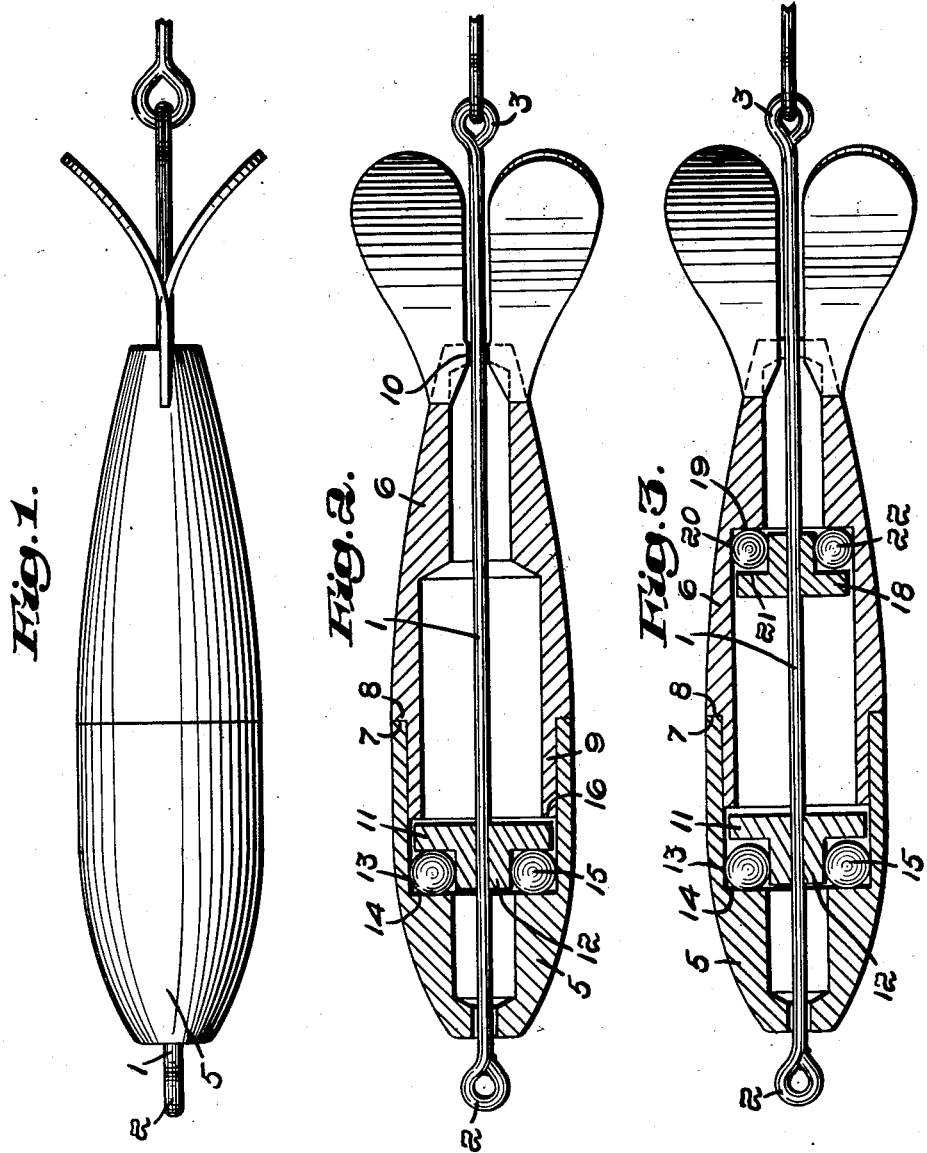
Inventor:
James S. O'Callaghan
by John E. R. Hayes
Attorney Patented May 22, 1951

2,554,342

UNITED STATES PATENT OFFICE 2,554,342

SPINNING BAIT

James S. O'Callaghan, Marblehead, Mass.

Application June 3, 1948, Serial No. 30,930

2 Claims. (Cl. 43—42.21)

The invention relates to a spinning bait in which a body, usually simulating a fish, is mounted on ball bearings, and turned by attached fins as the bait is drawn through the water.

The object of the invention is to provide a simple construction, and one economical in the sense that it can easily be made and assembled in manufacture.

The invention can best be seen and understood by reference to the drawings in which—

Fig. 1 shows the bait in side elevation.

Fig. 2 is a longitudinal vertical section of the bait as shown in Fig. 1; and

Fig. 3 is a longitudinal vertical section of the bait of modified structure to which special reference will later be made.

Referring to the drawings: 1 represents a wire or slender rod having a loop 2 at one end to which the line is attached and a loop 3 at its other end to which the hook is attached.

The wire extends through a body 4, usually simulating a fish, mounted to turn upon the wire. This body is made in sections 5 and 6 which are united at about the center of their longitudinal extension with the end 7 of section 5 in abutment with the shoulder 8 and with the reduced portion or neck 9 of section 6 fitting telescopically with press fit into the end portion of section 5. The ends of both sections narrow toward the rod or wire. The fore end of section 5 is narrowed, and apertured at its forward end, to assume a rather loose fit with relation to the wire passing through it. The rear end portion of section 6 turns upon the wire by an aperture forming a bearing 10, and is provided with fins shaped to produce rotation of the body when the bait is drawn forwardly through the water.

Mounted upon the wire is a collar 11 having a hub extension 12. In spaced parallel relationship to the side of the collar and to the peripheral surface of the hub the section 5 of the body has internal bearing surfaces 14 and 13, respectively, which co-operate with the side surface of the collar and the peripheral surface of the hub to form an annular box or bearing race within which is contained a set of roller bearings 15 which turn upon the respective surfaces.

Movement of the collar away from the roller bearings is limited by the end 16 of neck 9 of section 6, which said end 16 lies slightly spaced from the collar and this acts as a stop for limiting its movement away from the set of roller bearings and accordingly to maintain the body in proper rotative position on the wire without undue longitudinal displacement.

The loops on the ends of the wire are not formed until the parts are assembled. The mode of assembling is as follows: The wire bearing the collar is first passed through the section 6 of the body and through its end bearing 10. The section 5 of the body together with the assembled ball bearings is then passed over the wire and the two sections of the body then brought together with a press fit. The loops on the ends of the wire are afterwards formed.

In the construction thus far described while the maximum friction between the body and the wire is taken up by the ball bearings yet there is a slight amount of friction between the end bearing 10, on the section 6 of the body, with the wire. To eliminate this friction and make the device have a full roller bearing with relation to the wire another roller 18 with projecting hub 19 is attached to the wire. This roller and hub are located to occupy a complementary relationship, respectively, to bearings 20 and 21 within the section 6 of the body and co-operate therewith to form a box within which is contained a set of roller bearings 22.

The spaced relationship of the two rollers 11 and 18 on the wire is such that when the parts are assembled the rollers will have only a limited longitudinal play with relation to the respective sets of roller bearings and will accordingly not only act as a stop for limiting their movement away from the respective sets of roller bearings but also to maintain the body in proper rotative position on the wire without undue longitudinal displacement.

In assembling the parts of this modified structure the operation is substantially the same as before. With the wire bearing the rollers 11 and 18 the end of the wire is passed through the section 6 of the body and through the open end of this section leaving the roller 18 with the set of roller bearings 22 lying within the box provided for them in this body section. The section 5 of the body with set of roller bearings 15 is then passed over the wire and the two body sections combined with a press fit.

I claim:

1. A spinning bait comprising, in combination, a forward body section tapered toward its forward end and longitudinally apertured, a rear body section tapered toward its rear end and longitudinally apertured and provided with fins, said rear body section being provided with a reduced neck at its forward portion, the rearward portion of said forward body section extending over the neck of the rearward body section in press fit relation, a wire extending longitudinally through said body sections and outwardly of the bait body at each end thereof, a collar having a forwardly projecting hub extension fixedly mounted on said wire, said collar and wire being prevented from substantial rearward movement relative to the body sections by the forward end of the neck of the rear body section, said forward body section being interiorly shaped to cooperate with the forward side of the collar and the peripheral surface of the hub extension of said collar to form an annular bearing race, ball bearings disposed in said race and precluding substantial forward movement of said collar and said wire relative to the body sections.

2. A spinning bait comprising, in combination, a forward body section tapered toward its forward end and longitudinally apertured, a rear body section tapered toward its rear end and longitudinally apertured and provided with fins shaped to produce rotation of the body sections when the bait is drawn forwardly through the water, said rear body section being provided with a reduced neck at its forward portion, the rearward portion of said forward body section extending over the neck of the rearward body section in press fit relation, a wire extending longitudinally through said body sections and outwardly of the bait body at each end thereof, the portions of the wire exteriorly of the body being shaped for attachment to line and hook, a collar having a forwardly projecting hub extension fixedly mounted on said wire, said collar and wire being prevented from substantial rearward movement relative to the body sections by the forward end of the neck of the rear body section, said forward body section being interiorly shouldered to cooperate with the forward side of the collar and the peripheral surface of the hub extension of said collar to form an annular bearing race, ball bearings in said race and precluding substantial relative forward movement of said wire relative to the body sections, the apertures in said body sections permitting free rotation of said body sections about said wire.

JAMES S. O'CALLAGHAN.

REFERENCES CITED

The following references are of record in the file of this patent:

UNITED STATES PATENTS

| Number | Name | Date |
|---|---|---|
| 434,482 | Simonds | Aug. 19, 1890 |
| 517,235 | Pettit | Mar. 27, 1894 |